United States Patent Office.

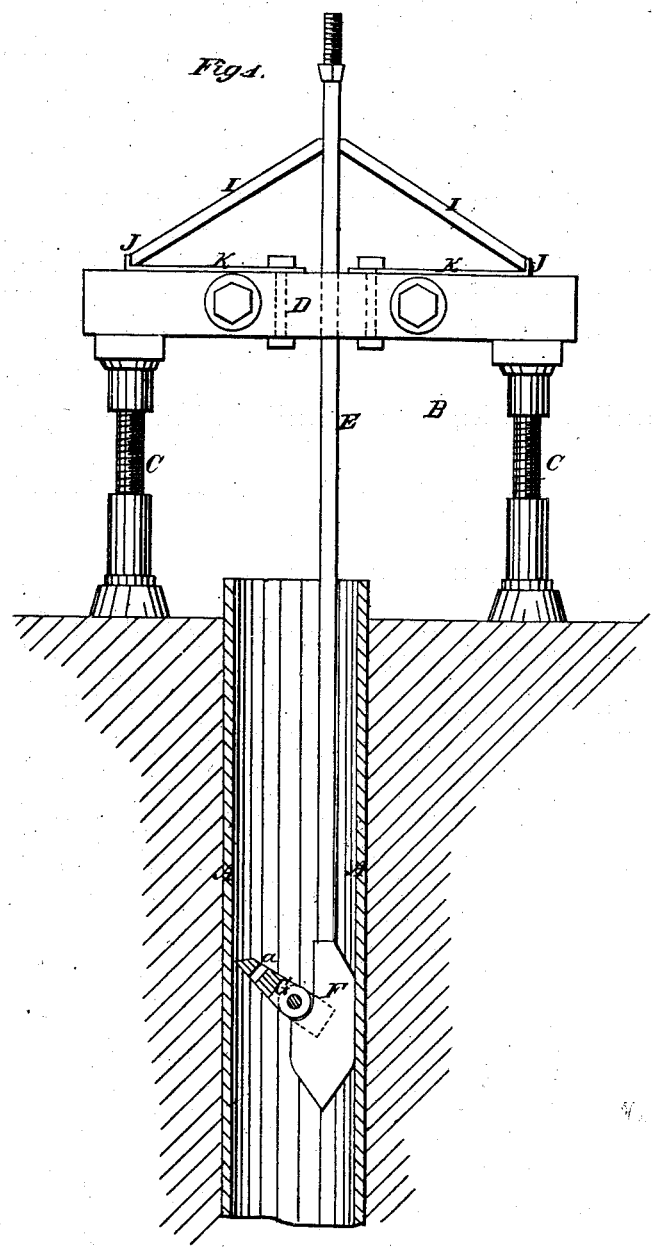

T. M. GILE AND W. COCHRAN, OF MANSFIELD, PENNSYLVANIA.

Letters Patent No. 62,404, dated February 26, 1867.

IMPROVED APPARATUS FOR DRAWING WELL-TUBES FROM WELLS.

*The Schedule referred to in these Letters Patent and making part of the same.*

TO ALL WHOM IT MAY CONCERN:

Be it known that we, T. M. GILE and W. COCHRAN, of Mansfield, in the county of Tioga, and State of Pennsylvania, have invented a new and improved Apparatus for the Drawing of Well-Tubes or Pipes; and we do hereby declare that the following is a full, clear, and exact description thereof, which will enable others skilled in the art to make and use the same, reference being had to the accompanying drawings, forming part of this specification.

The present invention relates to a novel and useful apparatus for the drawing of tubes or pipes, such as are used for oil or petroleum or artesian wells from the ground, whereby it can be accomplished with the utmost ease and facility, and in a most satisfactory manner.

In the accompanying plate of drawings our improved apparatus is illustrated—

Figure 1 being a side view of the same, showing it in connection with a well-tube which is in vertical section. Similar letters of reference indicate like parts.

A, in the drawings, represents the well-tube, over the upper end of which is placed a stand, B, that, at each corner, is supported by a post, C, similar in construction to the ordinary jack-screws employed for raising or lifting heavy articles. Through the centre of the stand top D extends a rod, E, that, passing down through the well-tube A, has an enlarged end, F, to which a dog, G, is hung or pivoted at one end, which dog has a sharp edge at its outer end, which, when the said rod is used to withdraw a well-tube, as will be hereinafter explained, engages with the inside surface of the well-tube, as is plainly illustrated in the drawings; this dog G being provided with an aperture, a, for receiving a cord by which it can be disengaged from the well-tube, when so desired, or, in other words, prevented from acting upon the same as the rod is drawn upward. On the stand top D, resting against the rod E at one end, are dogs I, that, at their other ends, rest against the raised ends J, of plates K, secured to the stand top D, so as to be susceptible of adjustment thereon, according as may be found necessary to bring them properly to bear against the rod. In the operation of the apparatus above explained, the stand B is placed over the well-tube which it is desired to draw up, when the rod is let down into the tube A to the required depth, and the dogs I thrown over and against the said rod. The jack-screws are then turned in the proper direction to raise the stand top D, which causes the dogs I to firmly grasp the rod E, which, in its turn, by its dog G, in the tube, seizes the tube, drawing it from the ground, as is obvious without any further explanation.

We claim as new, and desire to secure by Letters Patent—

The stand B, supported upon jack-screws C, and having dogs I, rod E, in combination with the dog G, on the end F, of the rod, so as to operate substantially in the manner and for the purpose described.

T. M. GILE,
W. COCHRAN.

Witnesses:
LUCINDA BEACH,
SARAH C. BEACH.